(12) United States Patent
Dellock et al.

(10) Patent No.: US 9,499,094 B1
(45) Date of Patent: Nov. 22, 2016

(54) RETRACTABLE RUNNING BOARD WITH LONG-PERSISTENCE PHOSPHOR LIGHTING

(71) Applicant: Ford Global Technologies, LLC, Dearborn, MI (US)

(72) Inventors: Paul Kenneth Dellock, Northville, MI (US); Stuart C. Salter, White Lake, MI (US); Michael Henry Maj, Livonia, MI (US); Aaron Bradley Johnson, Allen Park, MI (US); Michael A. Musleh, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/018,279

(22) Filed: Feb. 8, 2016

(51) Int. Cl.
| | |
|---|---|
| *B60Q 1/24* | (2006.01) |
| *B60Q 1/32* | (2006.01) |
| *B29C 45/00* | (2006.01) |
| *B29C 45/16* | (2006.01) |
| *B29K 23/00* | (2006.01) |
| *B29L 31/30* | (2006.01) |

(52) U.S. Cl.
CPC ........... *B60Q 1/323* (2013.01); *B29C 45/0001* (2013.01); *B29C 45/16* (2013.01); *B29K 2023/00* (2013.01); *B29K 2023/12* (2013.01); *B29K 2995/0018* (2013.01); *B29L 2031/3005* (2013.01)

(58) Field of Classification Search
CPC .............. B29C 45/0001; B29C 45/16; B29K 2023/00; B29K 2023/12; B29K 2995/0018; B29L 2031/3005; B60Q 1/323

USPC .......................................... 362/495, 509–510
See application file for complete search history.

(56) References Cited

U.S. PATENT DOCUMENTS

| | | |
|---|---|---|
| 4,838,567 A | 6/1989 | Michanczyk |
| 5,655,826 A | 8/1997 | Kouno et al. |
| 5,709,453 A | 1/1998 | Krent et al. |
| 6,031,511 A | 2/2000 | DeLuca et al. |
| 6,117,362 A | 9/2000 | Yen et al. |
| 6,367,940 B1 | 4/2002 | Parker et al. |
| 6,375,864 B1 | 4/2002 | Phillips et al. |
| 6,494,490 B1 | 12/2002 | Trantoul |
| 6,577,073 B2 | 6/2003 | Shimizu et al. |
| 6,604,834 B2 | 8/2003 | Kalana |
| 6,729,738 B2 | 5/2004 | Fuwausa et al. |
| 6,737,964 B2 | 5/2004 | Samman et al. |
| 6,773,129 B2 | 8/2004 | Anderson, Jr. et al. |
| 6,820,888 B1 | 11/2004 | Griffin |
| 6,851,840 B2 | 2/2005 | Ramamurthy et al. |
| 6,859,148 B2 | 2/2005 | Miller |

(Continued)

FOREIGN PATENT DOCUMENTS

| | | |
|---|---|---|
| CN | 2546262 Y | 4/2003 |
| CN | 101337492 A | 1/2009 |

(Continued)

*Primary Examiner* — Jason Moon Han
(74) *Attorney, Agent, or Firm* — Jason Rogers; Price Heneveld LLP

(57) ABSTRACT

A running board of a vehicle is provided herein. The running board includes a step pad and a photoluminescent structure coupled to the step pad. The photoluminescent structure is configured to luminesce in response to excitation light provided by an external light assembly and the photoluminescent structure continues to luminesce for a period of time after the excitation light ceases to be provided.

20 Claims, 8 Drawing Sheets

(56) References Cited

U.S. PATENT DOCUMENTS

| | | |
|---|---|---|
| 6,871,986 B2 | 3/2005 | Yamanaka et al. |
| 6,953,536 B2 | 10/2005 | Yen et al. |
| 6,990,922 B2 | 1/2006 | Ichikawa et al. |
| 7,161,472 B2 | 1/2007 | Strumolo et al. |
| 7,213,923 B2 | 5/2007 | Liu et al. |
| 7,264,366 B2 | 9/2007 | Hulse |
| 7,264,367 B2 | 9/2007 | Hulse |
| 7,441,914 B2 | 10/2008 | Palmer et al. |
| 7,501,749 B2 | 3/2009 | Takeda et al. |
| 7,575,349 B2 | 8/2009 | Bucher et al. |
| 7,745,818 B2 | 6/2010 | Sofue et al. |
| 7,753,541 B2 | 7/2010 | Chen et al. |
| 7,834,548 B2 | 11/2010 | Jousse et al. |
| 7,862,220 B2 | 1/2011 | Cannon et al. |
| 7,987,030 B2 | 7/2011 | Flores et al. |
| 8,016,465 B2 | 9/2011 | Egerer et al. |
| 8,022,818 B2 | 9/2011 | la Tendresse et al. |
| 8,071,988 B2 | 12/2011 | Lee et al. |
| 8,097,843 B2 | 1/2012 | Agrawal et al. |
| 8,136,425 B2 | 3/2012 | Bostick |
| 8,163,201 B2 | 4/2012 | Agrawal et al. |
| 8,178,852 B2 | 5/2012 | Kingsley et al. |
| 8,197,105 B2 | 6/2012 | Yang |
| 8,203,260 B2 | 6/2012 | Li et al. |
| 8,207,511 B2 | 6/2012 | Bortz et al. |
| 8,232,533 B2 | 7/2012 | Kingsley et al. |
| 8,247,761 B1 | 8/2012 | Agrawal et al. |
| 8,286,378 B2 | 10/2012 | Martin et al. |
| 8,408,766 B2 | 4/2013 | Wilson et al. |
| 8,415,642 B2 | 4/2013 | Kingsley et al. |
| 8,421,811 B2 | 4/2013 | Odland et al. |
| 8,435,616 B2 | 5/2013 | Wang |
| 8,466,438 B2 | 6/2013 | Lambert et al. |
| 8,519,359 B2 | 8/2013 | Kingsley et al. |
| 8,519,362 B2 | 8/2013 | Labrot et al. |
| 8,552,848 B2 | 10/2013 | Rao et al. |
| 8,606,430 B2 | 12/2013 | Seder et al. |
| 8,624,716 B2 | 1/2014 | Englander |
| 8,631,598 B2 | 1/2014 | Li et al. |
| 8,664,624 B2 | 3/2014 | Kingsley et al. |
| 8,683,722 B1 | 4/2014 | Cowan |
| 8,724,054 B2 | 5/2014 | Jones |
| 8,754,426 B2 | 6/2014 | Marx et al. |
| 8,773,012 B2 | 7/2014 | Ryu et al. |
| 8,846,184 B2 | 9/2014 | Agrawal et al. |
| 8,876,352 B2 | 11/2014 | Robbins et al. |
| 8,952,341 B2 | 2/2015 | Kingsley et al. |
| 9,006,751 B2 | 4/2015 | Kleo et al. |
| 9,057,021 B2 | 6/2015 | Kingsley et al. |
| 9,065,447 B2 | 6/2015 | Buttolo et al. |
| 3,187,034 A1 | 11/2015 | Tarahomi et al. |
| 9,299,887 B2 | 3/2016 | Lowenthal et al. |
| 2002/0159741 A1 | 10/2002 | Graves et al. |
| 2002/0163792 A1 | 11/2002 | Formoso |
| 2003/0179548 A1 | 9/2003 | Becker et al. |
| 2004/0213088 A1 | 10/2004 | Fuwausa |
| 2006/0087826 A1 | 4/2006 | Anderson, Jr. |
| 2006/0097121 A1 | 5/2006 | Fugate |
| 2006/0267308 A1 | 11/2006 | Decker, Jr. et al. |
| 2007/0032319 A1 | 2/2007 | Tufte |
| 2007/0285938 A1 | 12/2007 | Palmer et al. |
| 2008/0092318 A1 | 4/2008 | Sharpe |
| 2009/0129104 A1 | 5/2009 | Shimano et al. |
| 2009/0219730 A1 | 9/2009 | Syfert et al. |
| 2009/0251920 A1 | 10/2009 | Kino et al. |
| 2009/0260562 A1 | 10/2009 | Folstad et al. |
| 2009/0262515 A1 | 10/2009 | Lee et al. |
| 2011/0012062 A1 | 1/2011 | Agrawal et al. |
| 2012/0001406 A1 | 1/2012 | Paxton et al. |
| 2012/0104954 A1 | 5/2012 | Huang |
| 2012/0183677 A1 | 7/2012 | Agrawal et al. |
| 2012/0280528 A1 | 11/2012 | Dellock et al. |
| 2013/0335994 A1 | 12/2013 | Mulder et al. |
| 2014/0065442 A1 | 3/2014 | Kingsley et al. |
| 2014/0103258 A1 | 4/2014 | Agrawal et al. |
| 2014/0264396 A1 | 9/2014 | Lowenthal et al. |
| 2014/0266666 A1 | 9/2014 | Habibi |
| 2014/0373898 A1 | 12/2014 | Rogers et al. |
| 2015/0046027 A1 | 2/2015 | Sura et al. |
| 2015/0138789 A1 | 5/2015 | Singer et al. |
| 2015/0267881 A1 | 9/2015 | Salter et al. |
| 2015/0291086 A1 | 10/2015 | Salter et al. |
| 2016/0016506 A1 | 1/2016 | Collins et al. |

FOREIGN PATENT DOCUMENTS

| | | |
|---|---|---|
| CN | 201169230 Y | 2/2009 |
| CN | 201193011 Y | 2/2009 |
| CN | 203528386 U | 4/2014 |
| DE | 29708699 U1 | 7/1997 |
| DE | 10319396 A1 | 11/2004 |
| EP | 1793261 A1 | 6/2007 |
| EP | 2778209 A1 | 9/2014 |
| JP | 2000159011 A | 6/2000 |
| JP | 2007238063 A | 9/2007 |
| WO | 2006047306 A1 | 5/2006 |
| WO | 2014068440 A1 | 5/2014 |

RETRACTABLE RUNNING BOARD WITH LONG-PERSISTENCE PHOSPHOR LIGHTING

FIELD OF THE INVENTION

The present invention generally relates to vehicle lighting systems and more particularly relates to vehicle lighting systems employing photoluminescent structures.

BACKGROUND OF THE INVENTION

Illumination arising from the use of photoluminescent structures offers a unique and attractive viewing experience. It is therefore desired to implement such structures in automotive vehicles for various lighting applications.

SUMMARY OF THE INVENTION

According to one aspect of the present invention, a running board of a vehicle is provided. The running board includes a step pad and a photoluminescent structure coupled to the step pad. The photoluminescent structure is configured to luminesce in response to excitation light provided by an external light assembly and the photoluminescent structure continues to luminesce for a period of time after the excitation light ceases to be provided.

According to another aspect of the present invention, a running board of a vehicle is provided. The running board includes a step pad having a step area with a plurality of grooves. A photoluminescent structure is coupled to the grooves of the step area. The photoluminescent structure is configured to luminesce in response to excitation light provided by an external light assembly. The photoluminescent structure continues to luminesce for a period of time after the excitation light ceases to be provided.

According to yet another aspect of the present invention, a method of constructing a running board of a vehicle is provided. The method includes the steps of: injecting a base material into a mold to form a step pad having a step area with a plurality of grooves; and injecting a secondary material into the mold to form a photoluminescent structure that is bonded to the grooves and is configured to luminesce in response to excitation light provided by an external light assembly.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present disclosure are disclosed herein. However, it is to be understood that the disclosed embodiments are merely exemplary of the disclosure that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present disclosure.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The terms first, second, third, etc. as utilized herein may provide designations in reference to the figures for clarity. For example, a first portion and a second portion may be referred to in some implementations and only a second portion may be referred to in some additional implementations. Such designations may serve to demonstrate exemplary arrangements and compositions and should not be considered to designate a specific number of elements or essential components of any specific implementation of the disclosure, unless clearly specified otherwise. These designations, therefore, should be considered to provide clarity in reference to various possible implementations of the disclosure, which may be combined in various combinations and/or individually utilized in order to clearly reference various elements of the disclosure.

Figure 1:
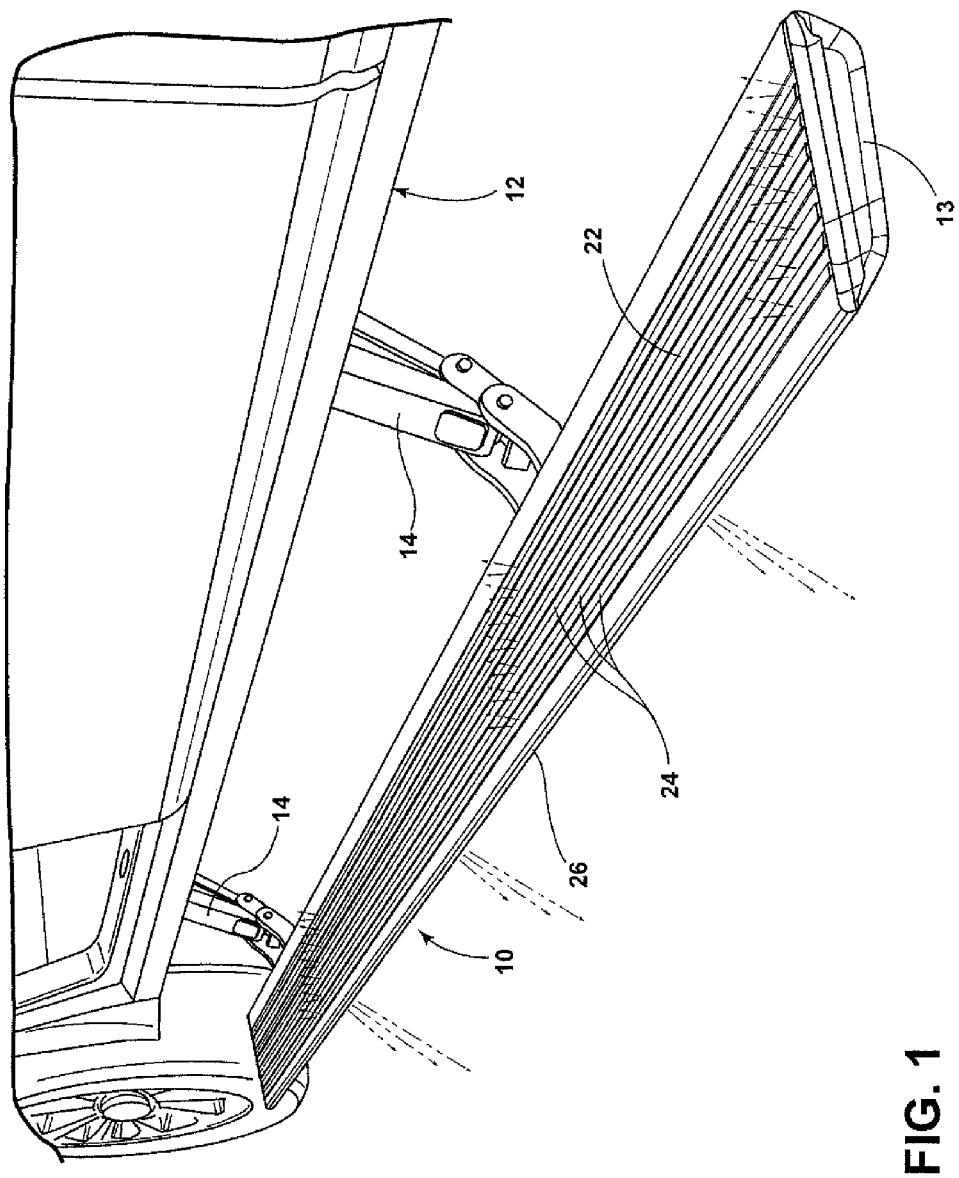
FIG. 1 illustrates a vehicle having a retractable running board that illuminates.
Figure 2:
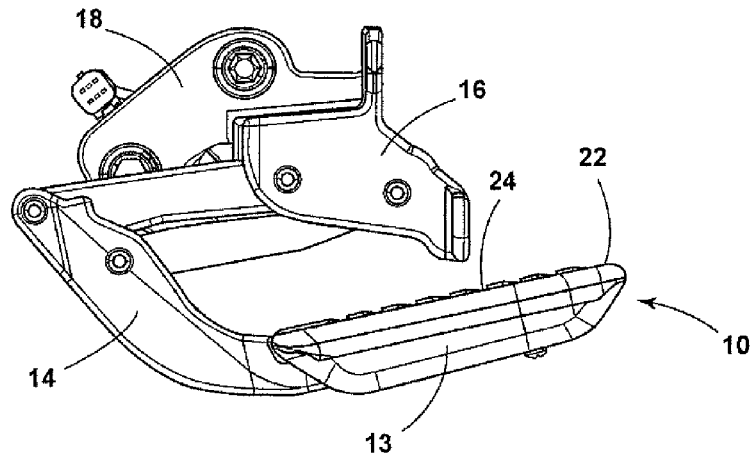
FIG. 2 illustrates the running board in a stowed position.
Figure 3:
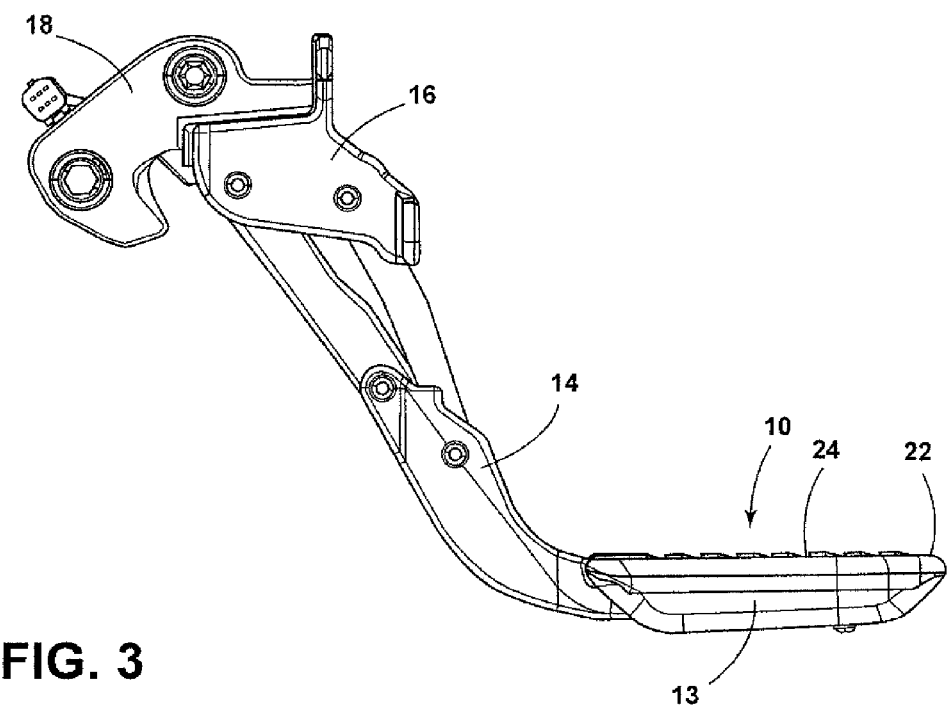
FIG. 3 illustrates the running board in a deployed position.

Referring now to FIGS. 1-3, reference numeral 10 generally designates a running board of a vehicle 12, which is exemplarily embodied as a pickup truck. The running board 10 includes a step pad 13 coupled to a pair of retracting mechanisms 14 that are each mounted to the vehicle underbody via a corresponding bracket 16. A motor 18 is operably coupled to each retracting mechanism 14 and is operable to cause the retracting mechanisms 14 to move the running board 10 between a stowed position (FIG. 2) and a deployed position (FIG. 3). As best shown in FIG. 1, the step pad 13 includes a step area 22, which defines a top surface of the step pad 13. In the illustrated embodiment, the step area 22 includes a plurality of grooves 24 for providing traction when a person steps onto the step pad 13 while entering or exiting the vehicle 12. It should be appreciated that the step area 22 may be variously dimensioned and the grooves 24 may be arranged in different patterns if desired. According to the illustrated embodiment, the grooves 24 are arranged in parallel and extend longitudinally across the step pad 13. As will be described below in greater detail, a photoluminescent structure may be coupled to one or more areas of the step pad 13 and is configured to luminesce in response to light excitation originating from an excitation source located external to the step pad 13. According to one embodiment, the step area 22 or portions thereof may exhibit luminesce as exemplarily represented in FIG. 1 by dashed arrows stemming from the step area 22. Additionally or alternatively an outer edge portion 26 of the step pad 13 may exhibit luminescence as is exemplarily represented by dashed lining stemming from the outer edge portion 26 in FIG. 1. It should be appreciated, however, that the illuminated areas of the step pad 13, as shown in FIG. 1, are for exemplary purposes and should not be construed as limiting. Indeed, it is possible for other areas of the step pad 13 to be illuminated pursuant to the teachings provided herein.

With respect to the embodiments described herein, the excitation source can include ambient light, both natural and artificial, for exciting the photoluminescent structure(s) when the running board 10 is in the deployed position. In some embodiments, the photoluminescent structure(s) includes long-persistence phosphors, which continue to luminesce for a period of time after the excitation light ceases to be provided. For example, in embodiments where the running board 10 is always maintained in the deployed position, the photoluminescent structure(s) may be excited by sunlight, thereby resulting in the running board 10 exhibiting luminescence throughout the day and for some time into the night. In contrast, with respect to embodiments where the running board 10 is generally maintained in the stowed position until a need arises, there is a concern that the photoluminescent structure(s) will be inadequately excited by ambient light in the surrounding operating environment due to the running board 10 being located underneath the vehicle 12. Accordingly, it is contemplated that a dedicated excitation source may be provided and tasked to supply excitation light to the photoluminescent structure(s) while the running board 10 is in the stowed position.

Figure 4:
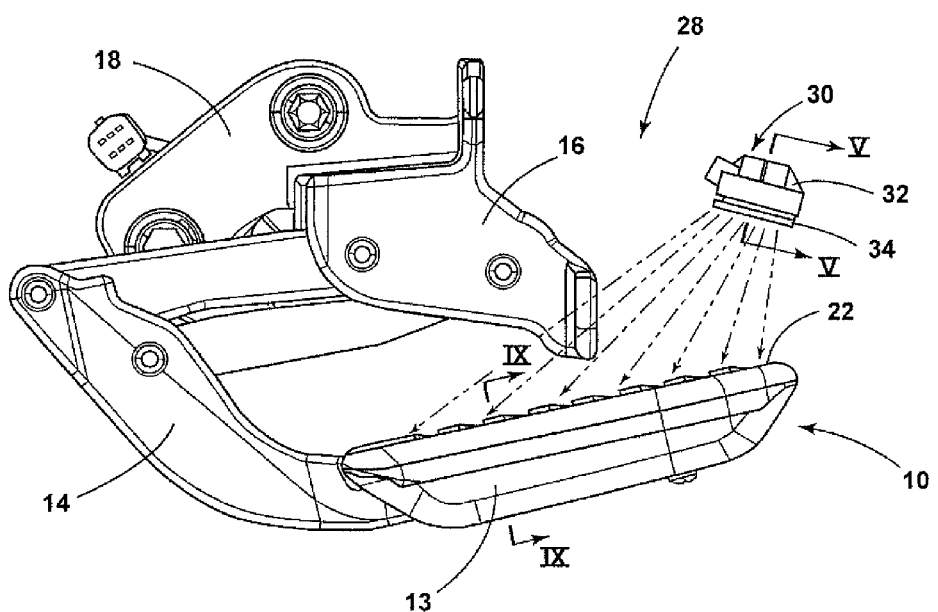
FIG. 4 illustrates a lighting system having a light assembly that functions as an excitation source when the running board is in the stowed position.
Figure 5:
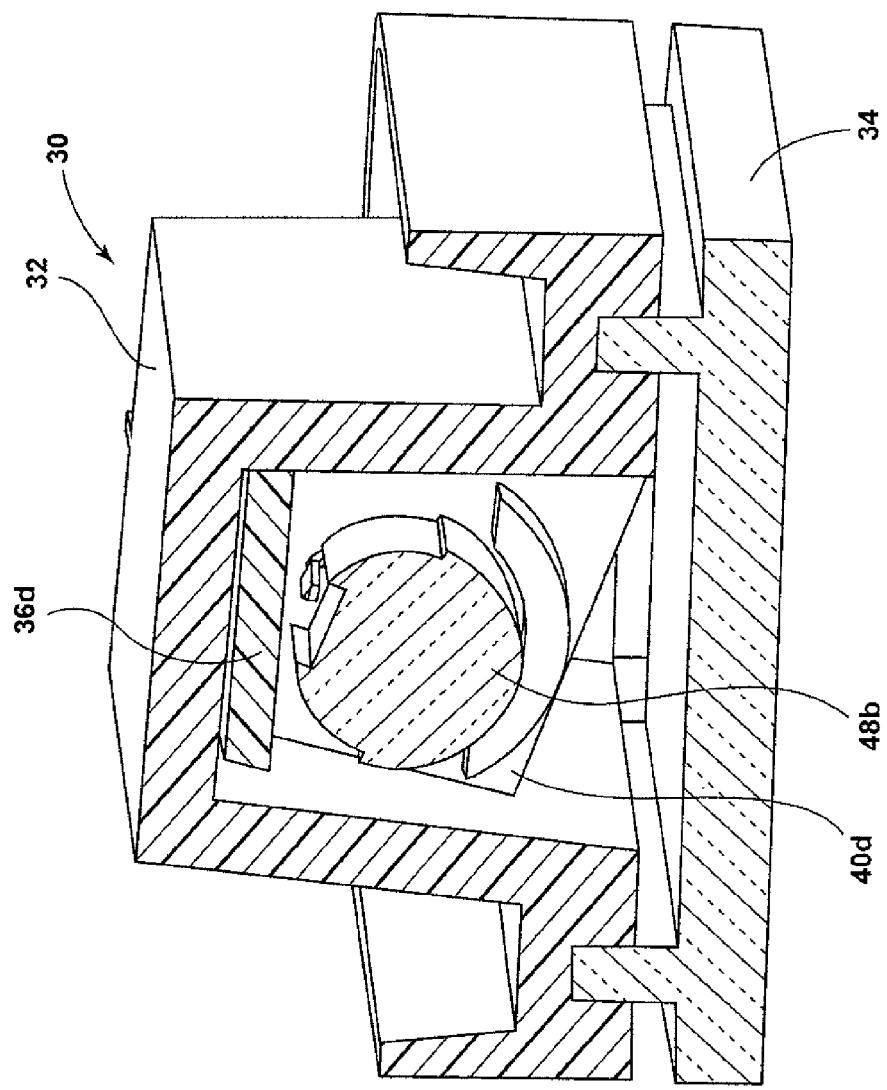
FIG. 5 is a cross-sectional view of the light assembly taken along line V-V of FIG. 4.
Figure 6:
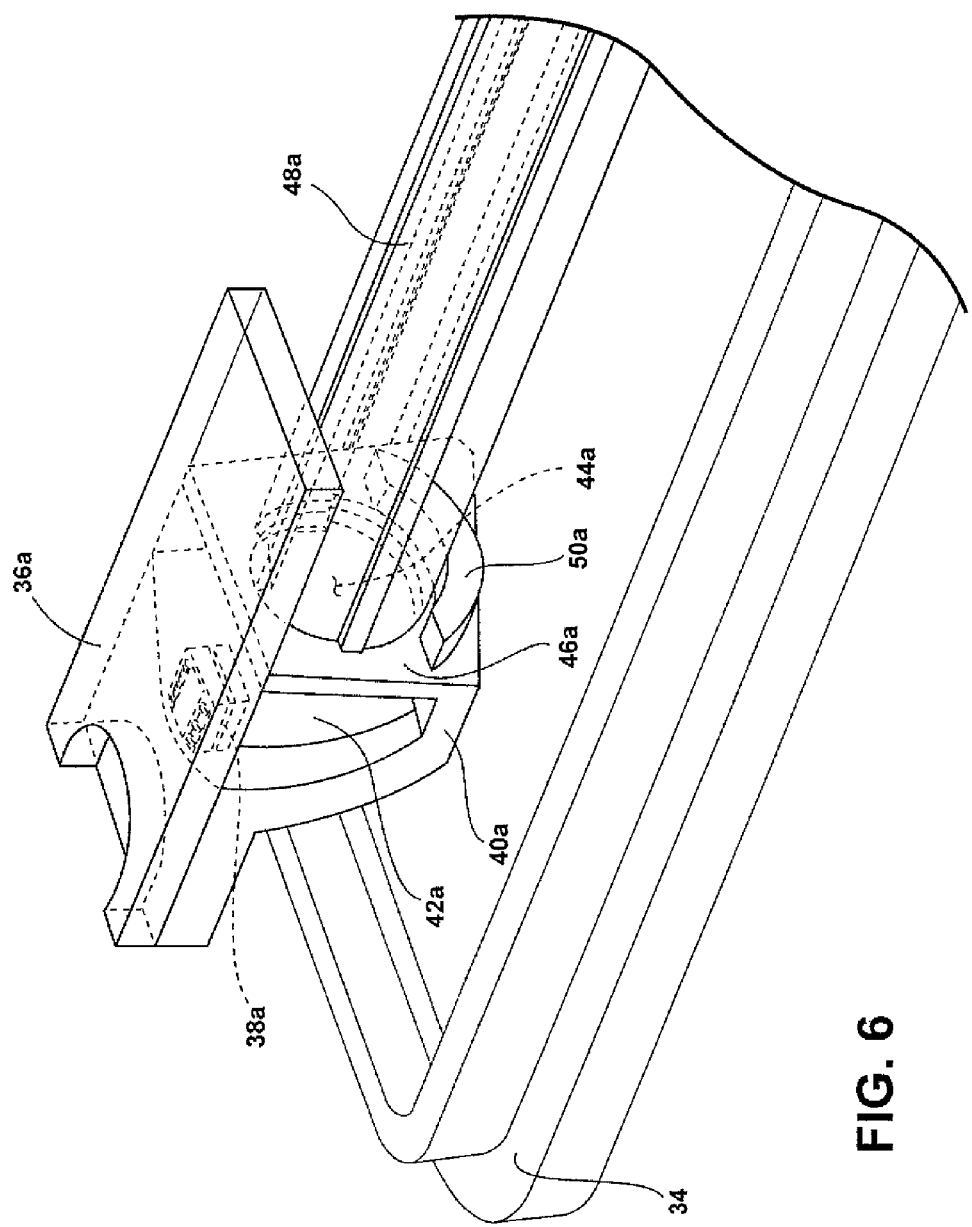
FIGS. 6-8 are perspective views of the light assembly shown in FIG. 4.
Figure 7:
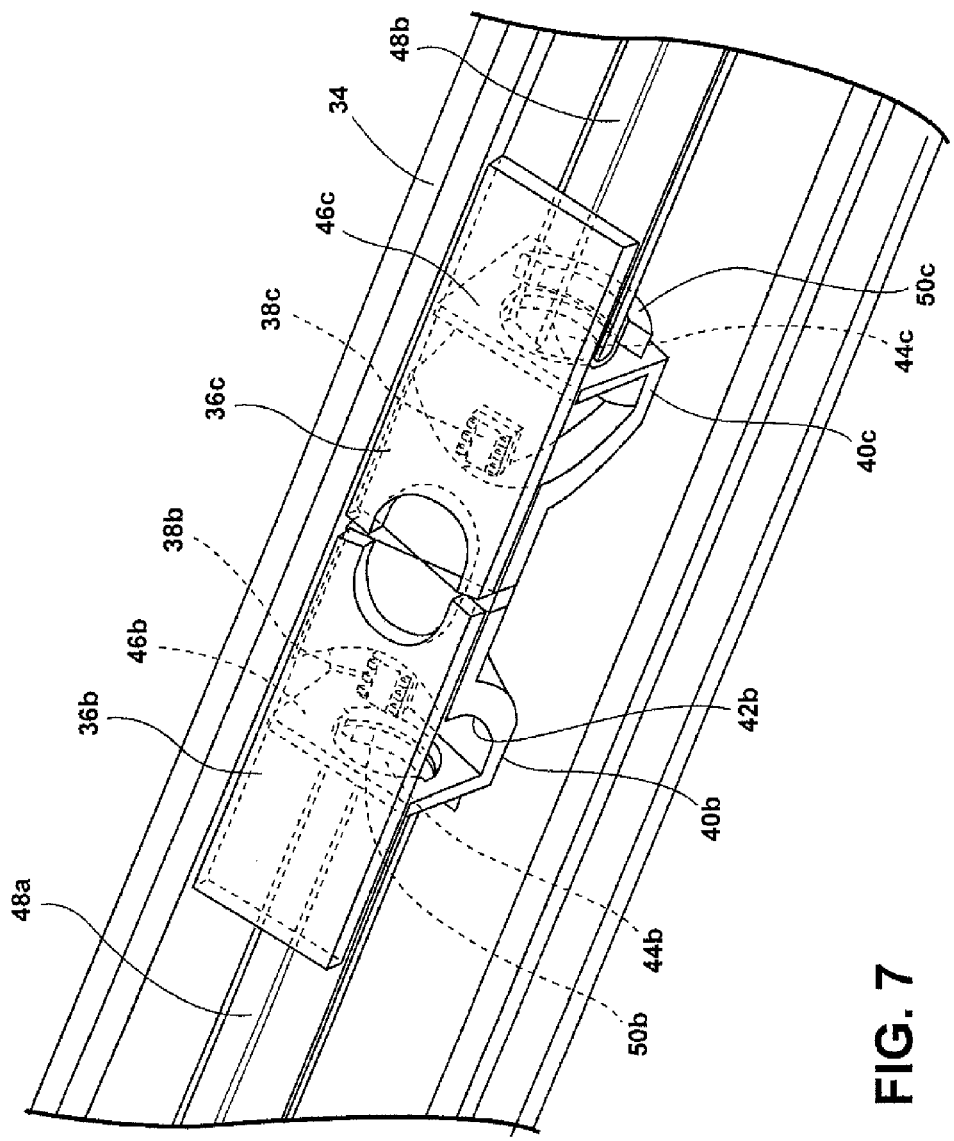
Figure 8:
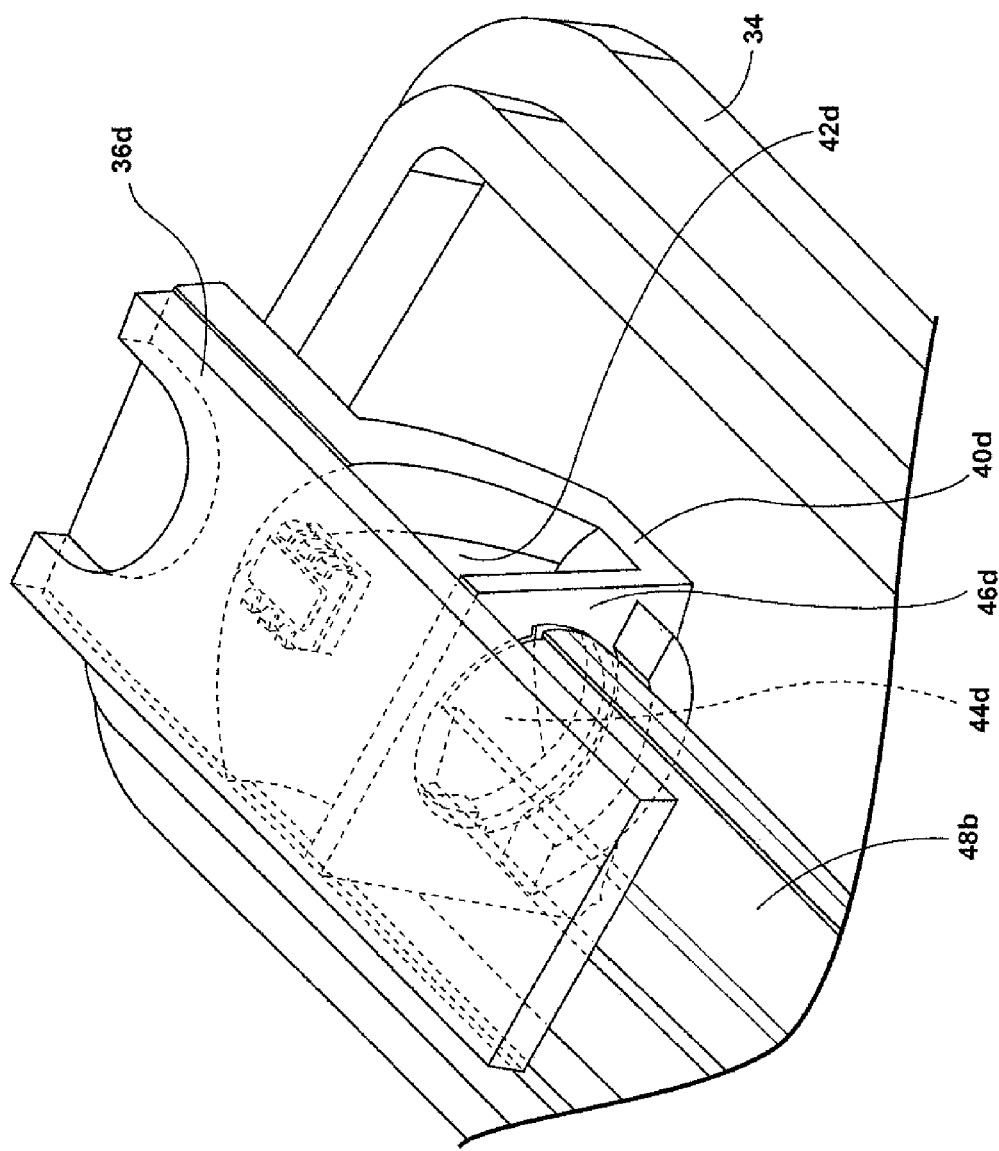

Referring to FIG. 4, a lighting system 28 is shown according to one embodiment. The lighting system 28 includes the running board 10 as described previously herein and illustrated in the stowed position. Additionally, the lighting system 28 includes a light assembly 30 that may be separate from and external to the running board 10. The light assembly 30 generally runs the length of the step pad 13 and includes a housing member 32 coupled to an optical member 34. The light assembly 30 is generally disposed above the running board 10 and may be variously mounted to the underbody or elsewhere on the vehicle 12. Thus, it should be appreciated that the light assembly 30 may be secured to or otherwise integrated with any structure of the vehicle 12 so as to permit the light assembly 30 to direct light toward the step pad 13. According to one embodiment, the light assembly 30 may be coupled to the underside of the vehicle 12 such that the light assembly 30 is located between the vehicle 12 and the running board 10. In this manner, the running board 10 shields the light assembly 30 from road debris when in the stowed position. As will be described in greater detail herein, the light assembly 30 is dimensioned and oriented such that excitation light emitted therefrom floods the step area 22 of the step pad 13 when the running board 10 is in the stowed position, as represented by the dashed arrows stemming from the optical member 34.

Referring to FIGS. 5-8, the light assembly 30 is shown in greater detail according to one embodiment. For purposes of clarity, the housing member 32 has been omitted in FIGS. 6-8. As shown, the housing member 32 and the optical member 34 may be wedged together and may be held together through friction or through the use of an adhesive and/or mechanical fastener(s). The light assembly 30 includes a plurality of printed circuit boards (PCBs) 36a-36d that are aligned with one another and are positioned within the housing member 32 such that they are located above the optical member 34. Each PCB 36a-36d may be conventionally secured to the underside of an upper portion of the housing member 32 and includes a corresponding light-emitting diode (LED) 38a-38d coupled to its underside and oriented to direct light in a general downward direction. With respect to the present embodiment, PCBs 36a and 36d are positioned toward opposite ends of the optical member 34 whereas PCBs 36b and 36c are located toward the center of the optical member 34 and may be in abutting contact. A light collector 40a-40d is coupled to the underside of each PCB 36a-36d and includes an arcuate surface 42a-42d configured to receive and direct (e.g., reflect) light emitted from the associated LED 38a-38d toward an opening 44a-44d formed through a vertical wall 46a-46d of the light collector 40a-40d that is substantially perpendicular to the associated PCB 36a-36d.

In the present embodiment, light collectors 40a and 40d are positioned such that their corresponding arcuate surface 42a, 42d faces inward whereas light collectors 40b and 40d are positioned back to back such that their corresponding arcuate surface 42b, 42c faces outward. As shown, a first light pipe 48a is optically coupled to the openings 44a, 44b of light collectors 40a and 40b and a second light pipe 48b is optically coupled to the openings 44c, 44d of light collectors 40c and 40d. The first and second light pipes 48a, 48b may be additionally supported in place by arcuate support members 50a-50d extending from the vertical walls 46a-46d of each light collector 40a-40d. In use, light emitted from LEDs 38a and 38b is directed into the first light pipe 48a by corresponding light collectors 40a and 40b whereas light emitted from LEDs 38c and 38d is directed into the second light pipe 48b by corresponding light collectors 40c and 40d. In alternative embodiments, the first and second light pipes 48a, 48b may be optically coupled to the PCBs 36a-36d such that the LEDs 38a-38d emit light directly into the first and second light pipes 48a, 48b thereby negating the need for the light collectors 40a-40d. In either embodiment, light propagating inside the first and second light pipes 48a, 48b is outputted therefrom toward the optical member 34, which may be configured as a Fresnel lens. Accordingly, it is contemplated that the upper half of the first and second light pipes 48a, 48b may be configured to reflect light downward to maximize the amount of light being outputted toward the optical member 34. Additionally or alternatively, the interior surfaces of the housing member 32 may also be configured to reflect light to accomplish the same.

Figure 9:
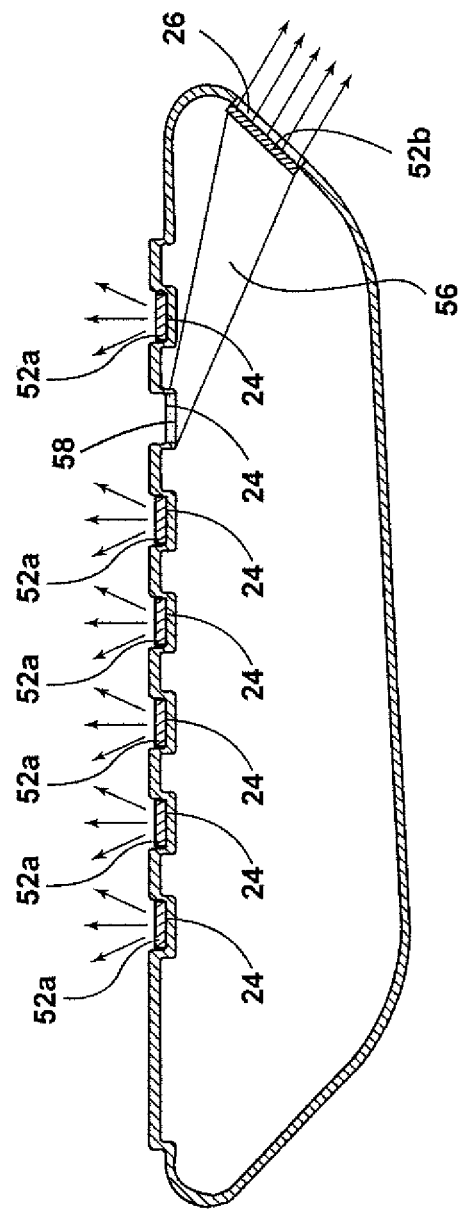
FIG. 9 is a cross-sectional view of a step pad taken along line IX-IX of FIG. 4.

Referring to FIG. 9, the step pad 13 is shown in greater detail according to one embodiment. The step pad 13 may be injection molded from a base material containing polypropylene or thermoplastic olefin. As shown a first photoluminescent structure 52a and/or a second photoluminescent structure 52b may be provided in exemplary locations of the step pad 13. Specifically, the first photoluminescent structure 52a is coupled to a number of the grooves 24 of the step pad 13 and may run the extent of the grooves 24. The second photoluminescent structure 52b is coupled to the outer edge portion 26 of the step pad 13 and may run the extent of the outer edge portion 26. It is to be understood that the second photoluminescent structure 52b may be disposed inside the step pad 13 or outside of the step pad 13. In either embodiment, the second photoluminescent structure 52b is optically coupled to a light-propagating element 56 that may be formed within the step pad 13 via a molding process. The light-propagating element 56 is also optically coupled to a light-permeable portion 58 located in the step area 22 of the step pad 13. It is contemplated that the light-permeable portion 58 and the light-propagating element 56 may extend the length of the step pad 13. As shown, the light-permeable portion 58 may be formed from one or more of the grooves 24 not occupied by the first photoluminescent structure 52a. In this manner, a portion of the excitation light supplied by the light assembly 30 may enter the light-propagating element 56 via the light-permeable portion 58 in order to reach the second photoluminescent structure 52b. Regardless of whether the second photoluminescent structure 52b is located inside or outside of the step pad 13, the outer edge portion 26, to which the second photoluminescent structure 52b is coupled, should be light-permeable thereby allowing either excitation light to reach the second photoluminescent structure 52b (e.g., if the second photoluminescent structure 52b is located outside of the step pad) or illumination stemming from the second photoluminescent structure 52b to be outputted from the step pad 13 (e.g., if the second photoluminescent structure 52b is located inside the step pad 13). Accordingly, it is noted herein that it is possible to excite the first and second photoluminescent structures 52a, 52b using a single excitation source (e.g., light assembly 30). With respect to the embodiments described herein, both the first and second photoluminescent structures 52a, 52b may be injection molded from a secondary material containing one or more long-persistence phosphors and is bonded to the corresponding locations of the step pad 13. Additionally, the secondary material may also contain a clarified polypropelene or a clarified thermoplastic olefin and may further be tinted. In one embodiment, the one or more long-persistence phosphors may make up 0.1 to 25% of the secondary material.

The long-persistence phosphors may be defined as being able to store excitation light provided by the light assembly 30 and release light gradually, for a period of several minutes or hours, once the excitation light is no longer being provided. The decay time may be defined as the time between the end of excitation and the moment when the light intensity of the photoluminescent structure 52a, 52b drops below a minimum visibility of 0.32 mcd/m$^2$. A visibility of 0.32 mcd/m$^2$ is roughly 100 times the sensitivity of the dark-adapted human eye, which corresponds to a base level of illumination commonly used by persons of ordinary skill in the art. Accordingly, the photoluminescent structures 52a, 52b may be formulated to emit light at or above an intensity of 0.32 mcd/m$^2$ after a period of 10 minutes. Additionally, the photoluminescent structures 52a, 52b may be formulated to emit light above or at an intensity of 0.32 mcd/m$^2$ after a period of 30 minutes and, in some embodiments, for a period substantially longer than 60 minutes (e.g., the period may extend 8 hours or longer). Thus, the photoluminescent structures 52a, 52b may continually illuminate in response to excitation light supplied by the light assembly 30 when the running board 10 is in the stowed position or in response to ambient light when the running board 10 is in the deployed position. It is contemplated that the illumination intensity of the photoluminescent structures 52a, 52b may be monitored such that the light assembly 30 is activated when the running board 10 is in the stowed position and when the illumination intensity of the photoluminescent structures 52, 52b falls below 0.32 mcd/m$^2$, or any other predefined intensity level. Alternatively, it is contemplated that the running board 10 may be controlled to move to the deployed position such that excitation light is supplied to the photoluminescent structures 52a, 52b based on the availability of ambient light, which may be determined in response to signals received from a conventional day/night sensor of the vehicle 12.

The long-persistence phosphors may correspond to alkaline earth aluminates and silicates, for example doped disilicates, or any other compound that is capable of emitting light for a period of time once excitation light is no longer present. The long-persistence phosphors may be doped with one or more ions, which may correspond to rare earth elements, for example, $Eu^{2+}$, $Tb^{3+}$ and/or $Dy^3$. According to one embodiment, the photoluminescent structures 52a, 52b may include a phosphorescent material in the range of about 30% to about 55%, a liquid carrier medium in the range of about 25% to about 55%, a polymeric resin in the range of about 15% to about 35%, a stabilizing additive in the range of about 0.25% to about 20%, and performance-enhancing additives in the range of about 0% to about 5%, each based on the weight of the formulation.

In operation, the photoluminescent structures 52a, 52b may be formulated to luminesce in the same color or a different color upon receiving excitation light from the light assembly 30 or ambient light. For example, it is contemplated that photoluminescent structures 52a, 52b may be configured to convert blue light or ultraviolet (UV) light into visible light found in the RGB color scale, which includes amber and white light. As shown in FIG. 9, luminescent light emitted by the first and second photoluminescent structures 52a, 52b is represented by solid arrows. It will be understood that the compositions provided herein are non-limiting examples. Thus, any long-persistence phosphor known in the art may be utilized without departing from the teachings provided herein. Moreover, it is contemplated that other phosphors, which do not necessarily exhibit long-persistence qualities, may also be utilized without departing from the teachings provided herein.

Additional information regarding the production of long-persistence photoluminescent structures is disclosed in U.S. Pat. No. 8,163,201 to Agrawal et al., entitled "HIGH-INTENSITY, PERSISTENT PHOTOLUMINESCENT FORMULATIONS AND OBJECTS, AND METHODS FOR CREATING THE SAME," issued Apr. 24, 2012; U.S. Pat. No. 6,953,536 to Yen et al., entitled "LONG PERSISTENT PHOSPHORS AND PERSISTENT ENERGY TRANSFER TECHNIQUE," issued Oct. 11, 2005; U.S. Pat. No. 6,117,362 to Yen et al., entitled "LONG-PERSISTENCE BLUE PHOSPHORS," issued Sep. 12, 2000; and U.S. Pat. No. 8,952,341 to Kingsley et al., entitled "LOW RARE EARTH MINERAL PHOTOLUMINESCENT COMPOSITIONS AND STRUCTURES FOR GENERATING LONG-PERSISTENCE LUMINESCENCE," issued Feb. 10, 2015, all of which are incorporated herein by reference in their entirety.

For the purposes of describing and defining the present teachings, it is noted that the terms "substantially" and "approximately" are utilized herein to represent the inherent degree of uncertainty that may be attributed to any quantitative comparison, value, measurement, or other representation. The term "substantially" and "approximately" are also utilized herein to represent the degree by which a quantitative representation may vary from a stated reference without resulting in a change in the basic function of the subject matter at issue.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:
1. A running board of a vehicle, comprising:
   a step pad on the running board;
   a photoluminescent structure coupled to the step pad;

wherein the photoluminescent structure is configured to luminesce in response to excitation light provided by a separate external light assembly on the vehicle; and wherein the photoluminescent structure continues to luminesce for a period of time after the excitation light ceases to be provided.

2. The running board of claim 1, wherein the step pad is injection molded from a base material containing polypropylene or thermoplastic olefin.

3. The running board of claim 2, wherein the photoluminescent structure is injection molded from a secondary material containing one or more long-persistence phosphors and is bonded to the step pad.

4. The running board of claim 3, wherein the secondary material further contains a clarified polypropylene or a clarified thermoplastic olefin.

5. The running board of claim 3, wherein the one or more long-persistence phosphors make up 0.1 to 25% of the secondary material.

6. The running board of claim 1, wherein the photoluminescent structure is tinted.

7. The running board of claim 1, wherein the photoluminescent structure is disposed in a plurality of grooves in a step area of the step pad.

8. A running board of a vehicle, comprising:
    a step pad of the running board having a step area with a plurality of grooves;
    a photoluminescent structure coupled to the grooves of the step area;
    wherein the photoluminescent structure is configured to luminesce in response to excitation light provided by a separate external light assembly on the vehicle; and
    wherein the photoluminescent structure continues to luminesce for a period of time after the excitation light ceases to be provided.

9. The running board of claim 8, wherein the step pad is injection molded from a base material containing polypropylene or thermoplastic olefin.

10. The running board of claim 9, wherein the photoluminescent structure is injection molded from a secondary material containing one or more long-persistence phosphors and is bonded to the step pad.

11. The running board of claim 10, wherein the secondary material further contains a clarified polypropylene or a clarified thermoplastic olefin.

12. The running board of claim 10, wherein the one or more long-persistence phosphors make up 0.1 to 25% of the secondary material.

13. The running board of claim 8, wherein the photoluminescent structure is tinted.

14. The running board of claim 8, wherein the grooves are arranged in parallel and extend longitudinally across the step pad.

15. A method of constructing a running board of a vehicle, comprising the steps of:
    injecting a base material into a mold to form a step pad having a step area with a plurality of grooves for the running board; and
    injecting a secondary material into the mold to form a photoluminescent structure that is bonded to the grooves and is configured to luminesce in response to excitation light provided by a separate external light assembly on the vehicle.

16. The method of claim 15, wherein the base material contains polypropylene or thermoplastic olefin.

17. The method of claim 16, wherein the secondary material contains one or more long-persistence phosphors.

18. The method of claim 17, wherein the secondary material further contains a clarified polypropylene or a clarified thermoplastic olefin.

19. The method of claim 17, wherein the one or more long-persistence phosphors make up 0.1 to 25% of the secondary material.

20. The method of claim 15, wherein the photoluminescent structure continues to luminesce for a period of time after the excitation light ceases to be provided.

* * * * *